3,293,283
PROCESS FOR TRANSESTERIFYING LOWER ALKYL ACRYLATES

Kenneth Rowland Dobson, Hull, and Bertram Yeomans, Preston, near Hull, England, assignors to The Distillers Company Limited, Edinburgh, Scotland, a British company
No Drawing. Filed Jan. 17, 1964, Ser. No. 338,316
Claims priority, application Great Britain, Feb. 7, 1963, 4,964/63
6 Claims. (Cl. 260—486)

The present invention relates to the production of alkyl acrylates by alcoholysis reaction.

In this reaction, a lower alkyl acrylate such as methyl or ethyl acrylate is heated with the alcohol whose acrylate is the desired product in the presence of an esterification catalyst. Among the most suitable esterification catalyst for this purpose are alkoxy derivatives of titanium such as the tetra-alkyl titanates. Since the titanate catalysts employed are obtained from titanium tetrachloride they all generally contain chloride ion which tends to cause loss of yield of the desired acrylate by initiating polymerisation. Further polymerisation may take place at other stages of the process; thus polymerisation may occur during subsequent hydrolysis of the titanate catalysts, and during distillation to recover the desired higher acrylate. Polymerisation is necessarily accompanied by loss of yield of the desired product, and the presence of polymer also renders the recovery of the last traces of product impracticable by distillation.

According to the present invention, the process for the production of a higher alkyl acrylate from a lower alkyl acrylate and a higher alcohol comprises reacting together at an elevated temperature a lower alkyl acrylate and a higher alcohol in the presence of an alkoxy derivative of titanium as catalyst and of a plasticizer oil, hydrolysing the catalyst in the product mixture and separating the titania produced, and recovering the desired higher acrylate from the product mixture by distillation.

The alcoholysis reaction may take place between any alkyl acrylate and a higher alcohol, but it is generally preferred to use the readily available methyl acrylate or ethyl acrylate. The higher alcohol may be any acyclic, alicyclic or aromatic alcohol having not less than three carbon atoms in the molecule, although the most useful products are obtained with alcohols having from three to twenty carbon atoms in the molecule.

The catalyst is an alkoxy derivative of titanium such as tetra-alkyl titanate, and may suitably be derived from the higher alcohol to be used in the reaction. Thus the reaction of 2-ethylhexanol with methyl or ethyl acrylate is suitably carried out in the presence of tetra-2-ethylhexyl titanate as catalyst.

The plasticiser oil which is incorporated in the reaction charge may be substantially any such oil which is compatible with the charge, and which is a solvent or partial solvent for acrylic ester polymers with a boiling point at least 50° C. higher than that of the acrylic ester product. Thus a hydrocarbon oil having a first boiling point in the vicinity of 380° C. is particularly suitable for use in a process for the preparation of a wide range of high boiling acrylic ester.

A particularly suitable plasticiser oil is one of the type represented by that marketed under the name of Ravolen 22DA (supplied by the Manchester Oil Refinery) which has a boiling range from about 380°–550° C. at atmospheric pressure. This oil contains 0.5% w./w. of combined nitrogen, and its basic properties are particularly useful in combating the deleterious effect of the chloride content of the titanate alcoholysis catalyst.

In any case the plasticiser oil should not contain significant quantities of oxygenated compounds such as esters, alcohols or ethers, which may interfere with the reaction or contaminate the product.

The amount of plasticiser oil used may vary within fairly wide limits, dependent upon the physical properties of the acrylic ester product and its polymer. Using Ravolen 22DA, amounts within the range from 1% to 20% w./w. based on the higher acrylate product should be suitable, and preferably from 5% to 10% w./w.

The alcoholysis reaction may suitably be carried out in the normal manner by mixing the lower acrylate with the higher alcohol and the catalyst, and heating the reaction mixture with the plasticiser oil and, if desired, an entrainer for the lower alcohol produced, until the reaction is complete. Hydrolysis of the catalyst may be effected by the addition of water or dilute mineral acid to the product mixture and heating the mixture, until hydrolysis is complete, at a temperature suitably within the range 100° C. to 130° C. Subsequently, the titania formed is removed by filtration, and the higher acrylate may then be recovered by distillation, if desired under reduced pressure.

At any stage in the process an organic base may be incorporated in the process mixture as described in our copending application, Serial No. 338,306, filed on even date herewith, and this may be particularly advantageous when the plasticizer oil has no basic properties.

The invention is illustrated by the following examples:

Example 1

1 mole of 2-ethylhexanol was reacted with 1.25 moles of ethyl acrylate in the presence of 2.4 moles of cyclohexane as entrainer and of 0.46% w./w. of tetra-2-ethylhexyl titanate as catalyst. The reaction was carried out at the reflux temperature of the mixture, and the ethyl alcohol was taken off over-head as the binary azeotrope with cyclohexane. Two runs were carried out, in one of which the alcoholysis charge contained no plasticiser oil; during this run there was an 8.2% yield loss to acrylate polymer during the reaction. In the second run, 1.8% of Ravolen 22DA and 0.003% of methylene blue was added to the alcoholysis charge, and the yield loss to acrylate polymer in this run was only 1.8%.

Example 2

The procedure of Example 1 was repeated, and the catalyst was hydrolysed after the addition of water to the product mixture. Two runs were carried out, in one of which the alcoholysis charge contained no plasticiser oil; in this run the yield loss to acrylate polymer during reaction and hydrolysis was 4.2%. In the second run, the charge contained 2.9% w./w. of Ravolen 22DA, and the yield loss to acrylate polymer during reaction and hydrolysis was only 2.3%.

Example 3

The procedure of Example 2 was repeated, the titania produced in the hydrolysis was removed by filtration, and 2-ethylhexyl acrylate was recovered by distillation under reduced pressure. Four different runs were carried out, the results of which are summarized in the table, which clearly illustrates the advantages of the use of the plasticiser oil.

TABLE

| Alcoholysis charge (moles) | | | Percent w./w. Ravolen 22DA based on acrylate product | Percent yield of acrylation alcohol used | Percent yield loss to acrylate polymer |
|---|---|---|---|---|---|
| Ethyl acrylate | 2-ethyl hexanol | Cyclo-hexane | | | |
| 1.25 | 1.0 | 2.4 | 0 | 83.6 | 14.2 |
| 1.25 | 1.0 | 2.4 | 1.1 | 87.2 | 12.8 |
| 1.25 | 1.0 | 2.4 | 2.3 | 91.3 | 3.4 |
| 1.25 | 1.0 | 2.4 | 7.1 | 98.5 | 2.3 |

We claim:

1. In the process for the production of acrylates by the transesterification reaction of a lower alkyl acrylate with a member selected from the group consisting of acyclic, alicyclic and aromatic alcohols having from 3 to 20 carbon atoms at an elevated temperature and recovering the desired acrylate from the product mixture by distillation, the improvement wherein the reaction is conducted in the presence of a tetra-alkoxy derivative of titanium as catalyst and of a hydrocarbon plasticizer oil having a boiling point at least 50° C. higher than the acrylic ester product, and wherein the catalyst is hydrolysed in the product mixture and the produced titania separated prior to recovering the desired acrylate product.

2. The process as claimed in claim 1 in which the lower alkyl acrylate is a member selected from the group consisting of methyl acrylate and ethyl acrylate.

3. The process as claimed in claim 1 in which the catalyst is a tetra alkoxy derivative of titanium derived from the higher alcohol employed in the reaction.

4. The process as claimed in claim 1 in which the catalyst is tetra-2-ethylhexyl titanate.

5. The process as claimed in claim 1 in which from 1% to 20% by weight of the plasticizer oil is employed, based upon the weight of the higher acrylate product.

6. The process as claimed in claim 1 in which from 5% to 10% by weight of the plasticizer oil is employed based upon the weight of the higher acrylate product.

References Cited by the Examiner

UNITED STATES PATENTS 2,822,348   2/1958   Haslam _____ 260—486 X
3,106,570   10/1963  Jaruzelski _____ 260—486 X

OTHER REFERENCES

Bovey, Chem. Rev., vol. 42, pp. 494–496 (1948).

LORRAINE A. WEINBERGER, *Primary Examiner.*

LEON ZITVER, *Examiner.*

D. P. CLARKE, A. P. HALLUIN, *Assistant Examiners.*